United States Patent [19]

Schnabel et al.

[11] Patent Number: 5,769,599
[45] Date of Patent: Jun. 23, 1998

[54] METHOD OF AND APPARATUS FOR SUPERIMPOSING DISCRETE ROWS OF PACKETS OF THE TOBACCO PROCESSING INDUSTRY

[75] Inventors: Wolfgang Schnabel, Reinbek; Joachim Dittrich; Nirian Junge, both of Hamburg, all of Germany

[73] Assignee: Topak Verpackungstechnik GmbH, Schwarzenbek, Germany

[21] Appl. No.: 738,395

[22] Filed: Oct. 25, 1996

[30] Foreign Application Priority Data

Dec. 9, 1995 [DE] Germany ................ 195 46 055.3

[51] Int. Cl.⁶ .................................................. B65B 35/44
[52] U.S. Cl. ...................... 414/791.6; 198/429; 198/436
[58] Field of Search ........................... 198/418.4, 429, 198/435, 436; 131/282, 283; 414/791.6, 794.7, 789.6

[56] References Cited

U.S. PATENT DOCUMENTS

| 3,352,435 | 11/1967 | Reinecke | 198/429 |
|---|---|---|---|
| 3,455,085 | 7/1969 | McIntyre | 198/435 |
| 3,507,089 | 4/1970 | Mizzelle et al. | |
| 3,685,631 | 8/1972 | Harris . | |
| 4,645,061 | 2/1987 | Welch | 198/420 |
| 4,756,400 | 7/1988 | Funo et al. | 198/429 |
| 4,932,190 | 6/1990 | Bergner et al. | 198/429 |
| 5,046,295 | 9/1991 | Knecht | 53/202 |
| 5,341,913 | 8/1994 | Francioni | 198/435 |
| 5,462,401 | 10/1995 | Brizzi et al. | 414/797 |

FOREIGN PATENT DOCUMENTS

| 38 33 390 A 1 | 5/1989 | Germany . |
|---|---|---|
| 39 41 601 A 1 | 6/1991 | Germany . |
| 42 13 166 A 1 | 10/1993 | Germany . |
| 43 17 374 C 2 | 12/1993 | Germany . |
| 4330427 A 1 | 7/1995 | Germany . |
| 1457624 | 12/1976 | United Kingdom . |
| 1549939 | 8/1979 | United Kingdom . |
| 2211 158 | 5/1992 | United Kingdom . |

OTHER PUBLICATIONS

Fed. Rep. Germany Search Report dated Apr. 11, 1996.

*Primary Examiner*—Karen M. Young
*Assistant Examiner*—Gregory A. Morse
*Attorney, Agent, or Firm*—Darby & Darby

[57] ABSTRACT

First and second conveyors transport discrete rows of cigarette packets to one or more elevators which lift successive packets of the two rows into an assembling plane wherein the packets are caused to form a succession of arrays each containing a first group of packets from one of the conveyors and a second group of packets from the other conveyor. The first groups of successive arrays are lifted to a first additional plane above, and the second groups of successive arrays are lowered into a second additional plane below the assembling plane. The thus lifted and lowered first and second groups of successive arrays are shifted in their respective additional planes onto a third conveyor between the first and second conveyors so that the first groups overlap but are spaced apart from the respective second groups, and the third conveyor transports the first and second groups of successive arrays in such a way that the first groups descend onto the respective second groups. The thus modified arrays are ready for introduction into cartons. A fresh array is formed in the assembling plane while the groups of the preceding array are being manipulated in the respective additional planes.

24 Claims, 5 Drawing Sheets

METHOD OF AND APPARATUS FOR SUPERIMPOSING DISCRETE ROWS OF PACKETS OF THE TOBACCO PROCESSING INDUSTRY

BACKGROUND OF THE INVENTION

The invention relates to the manipulation of packets of the tobacco processing industry, and more particularly to improvements in methods of and apparatus for accumulating arrays of packets of plain or filter cigarettes or other articles or commodities of the tobacco processing industry into arrays containing predetermined numbers of packets in a predetermined distribution. For example, the method and apparatus of the present invention can be resorted to for the accumulation of successive arrays each of which contains two overlying contacting rows or files of packets in a formation ready for introduction into so-called cartons or other suitable containers.

It has become customary to supply to the so-called box packer of a production line employing two cigarette packers and two film wrappers two rows of packets of plain or filter cigarettes for confinement in boxes known as cartons. Problems arise during merging of the outputs of the two film wrappers (which confine individual soft packs or hinge lid packs in transparent film, normally with tear tape incorporated in the thus obtained envelopes) into formations or arrays which are ready for introduction into a single or common pack boxer or carton filler. Since the output of each individual film wrapper can be very high, the merging of the packets issuing from pairs of such film wrappers must involve movements of discrete packs in a plurality of different directions and at a very high frequency in order to meet the requirements of a high-speed pack boxer. Furthermore, the conversion of two rows of packets into a series of successive formations or arrays which are ready for introduction into cartons or other suitable containers should be performed by equipment whose space requirements are as small as possible so that such equipment does not contribute unduly to the space requirements of a production line with plural film wrappers for a common pack boxer.

OBJECTS OF THE INVENTION

An object of the invention is to provide a novel and improved method of manipulating packets of the tobacco processing industry which issue from plural machines each of which discharges a single row of successive packets.

Another object of the invention is to provide a novel and improved method of converting several rows of discrete packets into a succession of arrays or formations each of which contains packets received from each of the plural rows.

A further object of the invention is to provide a method which ensures gentle treatment of packets and which can assemble packets issuing from plural sources into a succession of arrays or formations best suited for the treatment (such as confinement in containers) at the immediately following or a next-following processing station.

An additional object of the invention is to provide a novel and improved method of manipulating packets of plain or filter cigarettes or other products of the tobacco processing industry at a junction where the outputs of plural machines must be merged into formations ready to be treated by a single machine.

Still another object of the invention is to provide a method which renders it possible to process the outputs of plural preceding machines into a series of formations ready for the processing in a next-following machine at a frequency greatly exceeding that achievable by resorting to presently known methods.

A further object of the invention is to provide a novel and improved apparatus for the practice of the above outlined method.

Another object of the invention is to provide a novel and improved apparatus which can be installed between plural film wrappers and a single pack boxer in a production line for the making and/or packaging of cigarettes or other products of the tobacco processing industry.

An additional object of the invention is to provide the apparatus with novel and improved means for controlling the speed of advancement of packets during certain stages of conversion of several rows of packets into a single series of arrays containing several layers or files of packets.

Still another object of the invention is to provide an apparatus which can be put to use in existing production lines serving to package cigarettes or other products of the tobacco processing industry.

A further object of the invention is to provide the apparatus with novel and improved means for simultaneously forming and manipulating several successive arrays or accumulations of packets which contain predetermined numbers of plain or filter cigarettes or other products of the tobacco processing industry.

Another object of the invention is to provide a production line which embodies the above outlined apparatus.

An additional object of the invention is to provide an apparatus which can treat the packets gently but at a frequency or rate greatly exceeding the frequency of treatment of packets in heretofore known apparatus for effecting a merger of several rows or successions of packets into a single series of arrays containing several layers or files of packets.

SUMMARY OF THE INVENTION

One feature of the instant invention resides in the provision of a method of manipulating packets of the tobacco processing industry, for example, packets which contain plain or filter ciarettes in the customary quincunx formation. The improved method comprises the steps of advancing first and second rows of successive packets along first and second paths (for example along paths which are adjacent and at least substantially parallel to each other and wherein the packets are caused to advance in a predetermined direction), assembling in a predetermined plane successive arrays of first and second groups—each of which contains a predetermined number of packets, e.g., an elongated file of five successive packets—from the packets which are respectively advanced along the first and second paths, displacing the first and second groups of successive arrays from the predetermined plane into first and second additional planes which are disposed at different levels, shifting at least one of the thus displaced first and second groups of successive arrays in the respective additional plane so that the thus shifted at least one group and the other group of the respective array overlap and are spaced apart from each other, and reducing the spacing between the overlapping first and second groups of successive arrays, preferably to such an extent that the groups of each array ultimately form two contacting superimposed layers of packets which are ready for introduction into a carton or another suitable container.

In accordance with a presently preferred embodiment of the method, the first and second additional planes are respectively located above and below the predetermined plane, and the shifting step can include moving the first and second elongated groups of packets in the respective additional planes sideways into a third path which is disposed between the first and second paths.

The step of reducing the spacing between the overlapping first and second groups of successive arrays can include conveying the first and second groups of successive arrays in the predetermined direction along the third path longitudinally of the groups of packets. The step of reducing the spacing can further include transporting the first groups of successive arrays downwardly toward and onto the second groups of the respective arrays.

The method can further comprise the step of assembling a next-following array in the predetermined plane in the course of the shifting step involving the group or groups of the immediately preceding array.

The predetermined plane can be located at a first level and the first and second paths can be located at a different second level; the assembling step then comprises transferring successive packets of the first and second groups from the respective first and second paths into the predetermined plane. If the second level is disposed beneath the first level, the transferring step includes lifting packets from the first and second paths into the predetermined plane. The assembling step preferably further comprises moving seriatim discrete packets of the first and second groups into the predetermined plane and moving the growing groups of successive arrays in the predetermined plane longitudinally of the respective files which form the groups.

The assembling step can comprise propelling packets into receptacles with attendant expulsion of air from the receptacles, and such method can further comprise the step of regulating the expulsion of air from the receptacles to thus control the speed of propulsion of packets which are being propelled into the receptacles. The displacing step of such method preferably comprises displacing the receptacles with the groups of packets therein.

Another feature of the invention resides in the provision of an apparatus for manipulating packets of the tobacco processing industry. The improved apparatus comprises first and second means for respectively advancing first and second rows of successive packets along first and second paths (preferably along paths which are adjacent and at least substantially parallel to each other and wherein the packets are caused to advance in a predetermined direction), means for assembling in a predetermined plane successive arrays of first and second groups—containing predetermined numbers of packets which preferably form elongated files of, for example, five packets each—from the packets which are respectively advanced along the first and second paths, means for displacing the first and second groups of successive arrays from the predetermined plane into first and second additional planes which are disposed at different levels, and means for shifting at least one of the thus displaced first and second groups of successive arrays in the respective additional plane so that the thus shifted at least one group and the other group of the respective array overlap and are preferably spaced apart from each other.

It is presently preferred to design the assembling means in such a way that it comprises at least one receptacle for each of the first and second groups of the respective arrays, and the displacing means of such apparatus comprises means for displacing the receptacles from the predetermined plane into the respective additional planes. Such displacing means can comprise means for moving the at least one receptacle for the first groups upwardly from the predetermined plane into the first additional plane and for moving the at least one receptacle for the second groups of packets from the predetermined plane downwardly into the second additional plane. The shifting means of such apparatus can comprise means for shifting the first and second groups of successive arrays in the respective additional planes into a third path wherein the first and second groups of successive arrays overlap and are spaced apart from each other. Such apparatus can further comprise means for conveying successive arrays of first and second groups along the third path, preferably in the predetermined direction.

It is presently preferred to construct the assembling means in such a way that it comprises a first pair of receptacles for the first groups and a second pair of receptacles for the second groups of the arrays. The arrangement is preferably such that one receptacle of each pair of receptacles is located in the predetermined plane when the other receptacle of the respective pair is located in the corresponding additional plane, and vice versa. Thus, the receptacles are located at three different levels whenever a receptacle of each pair is located in the predetermined plane provided that the first additional plane is located at a level above and the second additional plane is located at a level below the level of the predetermined plane.

The conveying means can comprise means for effecting a movement of at least one group of each of the successive arrays toward the other group of the respective array during conveying of the arrays along the third path so that the spacing between the groups of successive arrays is reduced at least close to zero. Such means for effecting a movement can include one or more downwardly sloping ramps or inclines for the first groups of successive arrays.

Each of the aforementioned receptacles or pairs of receptacles can comprise or constitute a cassette, and the apparatus employing such cassettes as part of the assembling means can further comprise means for separably coupling the casettes to the displacing means.

The assembling means can further comprise means for propelling packets into the receptacles at the predetermined plane with attendant expulsion of air from the receptacles, and such apparatus can further comprise means (e.g., in the form of suitably dimensioned covers, flaps, gates or analogous valving elements) for regulating the expulsion of air from the receptacles to thus control the speed of propulsion of the packets which are being propelled into the respective receptacles.

As already mentioned above, each group can comprise an elongated file of discrete packets, and the assembling means can further comprise means for moving discrete packets of the groups in the predetermined plane.

As also mentioned hereinbefore, the predetermined plane can be located at a first level and the first and second paths can be located at at least one additional level other than the first level. The means for assembling then includes means for transferring packets from the at least one additional level into the predetermined plane. The first and second paths can be located in a common additional plane at a level below the predetermined plane; the transferring means then comprises means for lifting the packets from the level of the first and second paths to the level of the predetermined plane.

The novel features which are considered as characteristic of the invention are set forth in particular in the appended claims. The improved apparatus itself, however, both as to its construction and the mode of operating the same, together with additional features and advantages of the apparatus and of the method, will be best understood upon perusal of the following detailed description of certain presently preferred specific embodiments with reference to the accompanying drawings.

DESCRIPTION OF PREFERRED EMBODIMENTS

Figure 1:
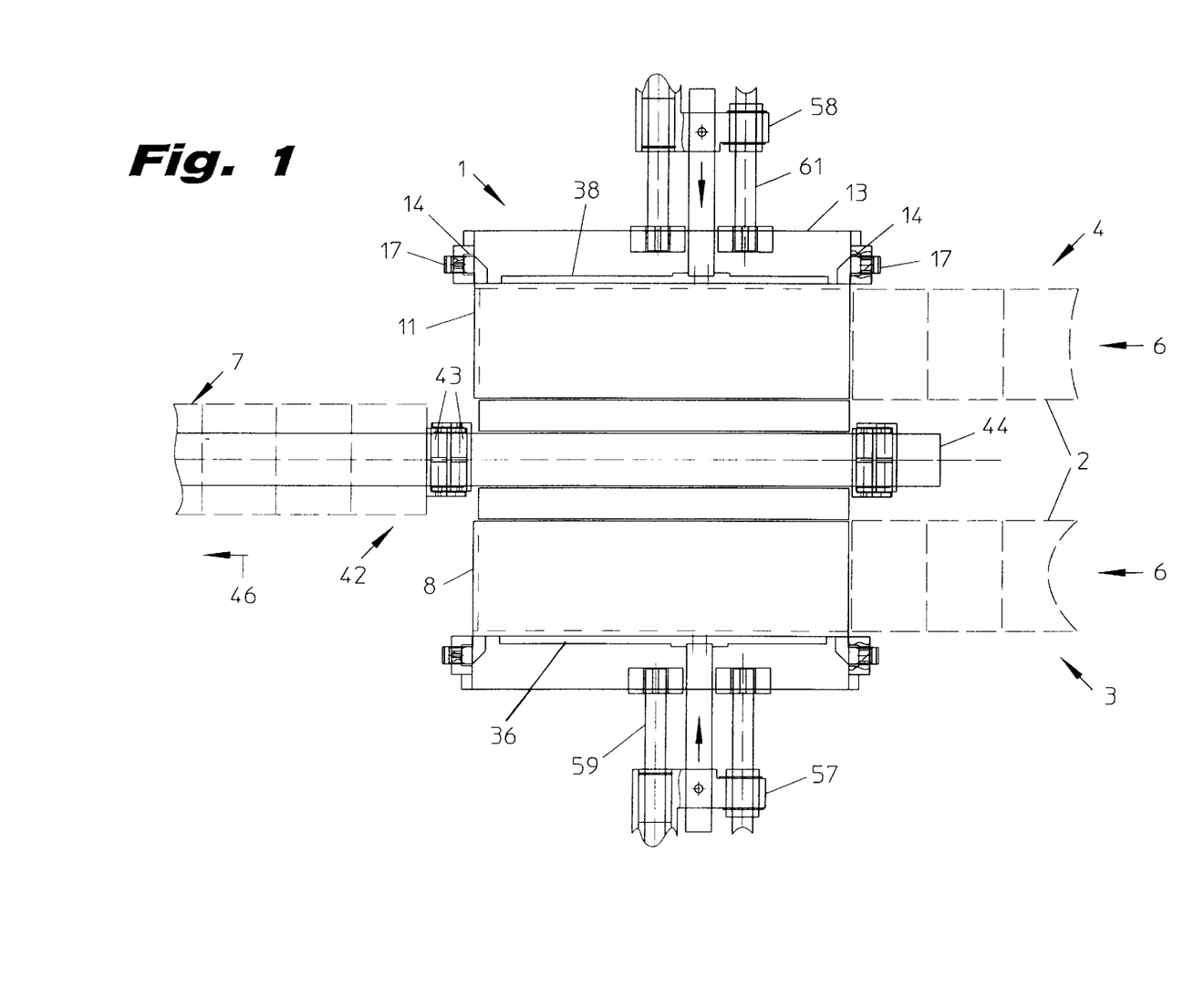
FIG. 1 is a fragmentary plan view of an apparatus which embodies one form of the invention.
Figure 2:
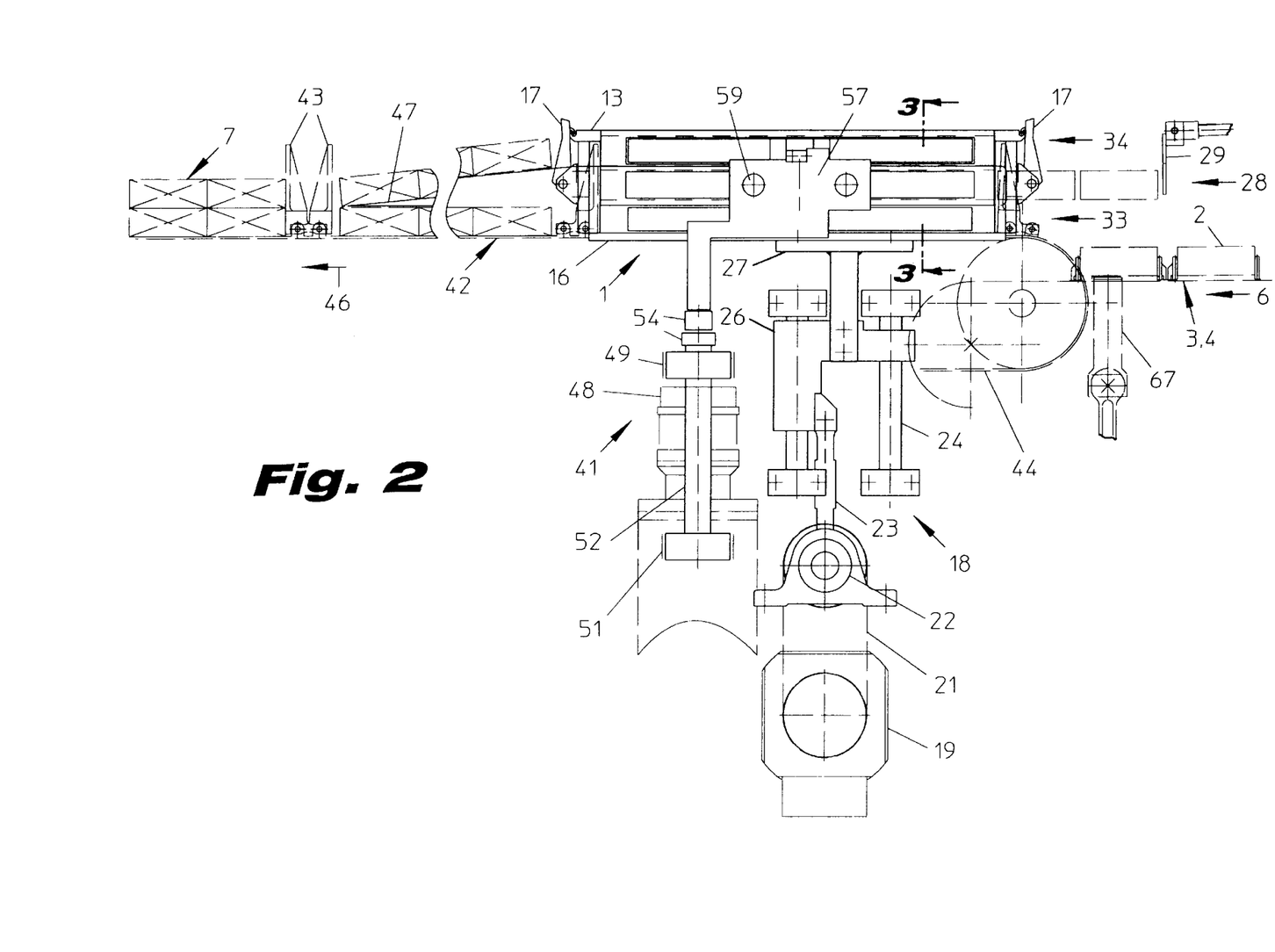
FIG. 2 is a fragmentary side elevational view of the apparatus as seen from the bottom of FIG. 1.

Referring first to FIGS. 1 and 2, there is shown an apparatus 1 for the manipulation of packets 2, e.g., packets each of which contains twenty plain or filter cigarettes in the customary quincunx formation. The apparatus 1 comprises two conveyors 3, 4 serving as a means for advancing two discrete rows of packets in the directions indicated by the arrows 6 along two elongated paths which are parallel to and relatively closely adjacent each other and are disposed in a horizontal plane at a level below a predetermined array assembling plane 28. Each of the conveyors 3, 4 can comprise an elongated belt or chain conveyor having an elongated horizontal upper run for stepwise advancement of the respective row of packets in the direction indicated by the arrows 6 from a discrete film wrapper or from a film wrapper which is designed to discharge two discrete rows of packets 2.

The purpose of the improved apparatus 1 is to convert the two rows of packets 2 which are delivered by the conveyors 3, 4 into a single series or succession of formations 7 each of which contains two files or layers of five packets each, with the packets of the upper layer overlying and contacting the adjoining packets of the lower layer. Such formations (modified arrays) 7 are ready to be confined in so-called cartons or analogous containers for cigarette packets or packets containing other products of the tobacco processing industry. Machines for confining formations of packets in cartons or analogous containers are known as pack boxers.

Figure 3:
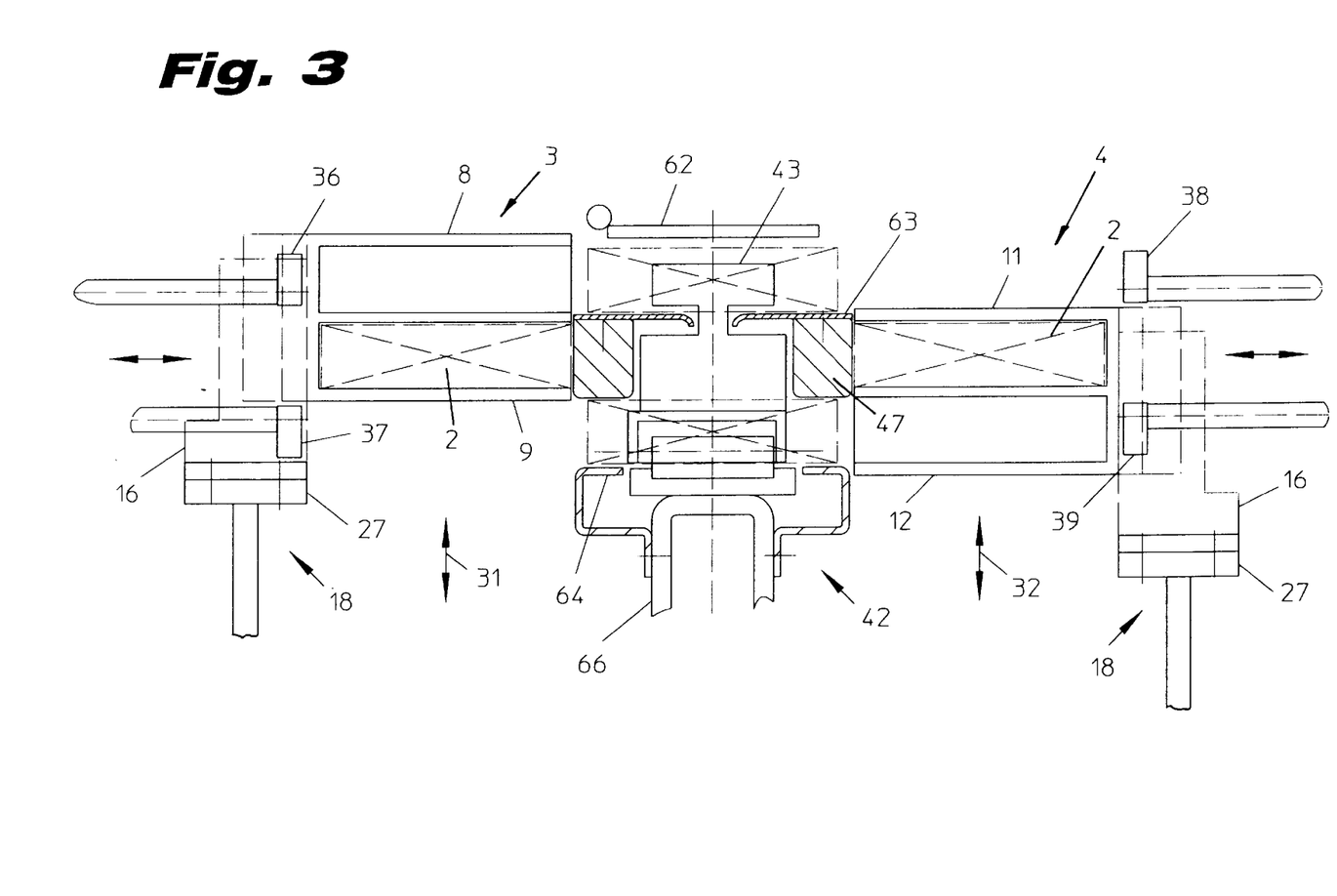
FIG. 3 is an enlarged fragmentary sectional view as seen from the line A–B in FIG. 2.
Figure 4:
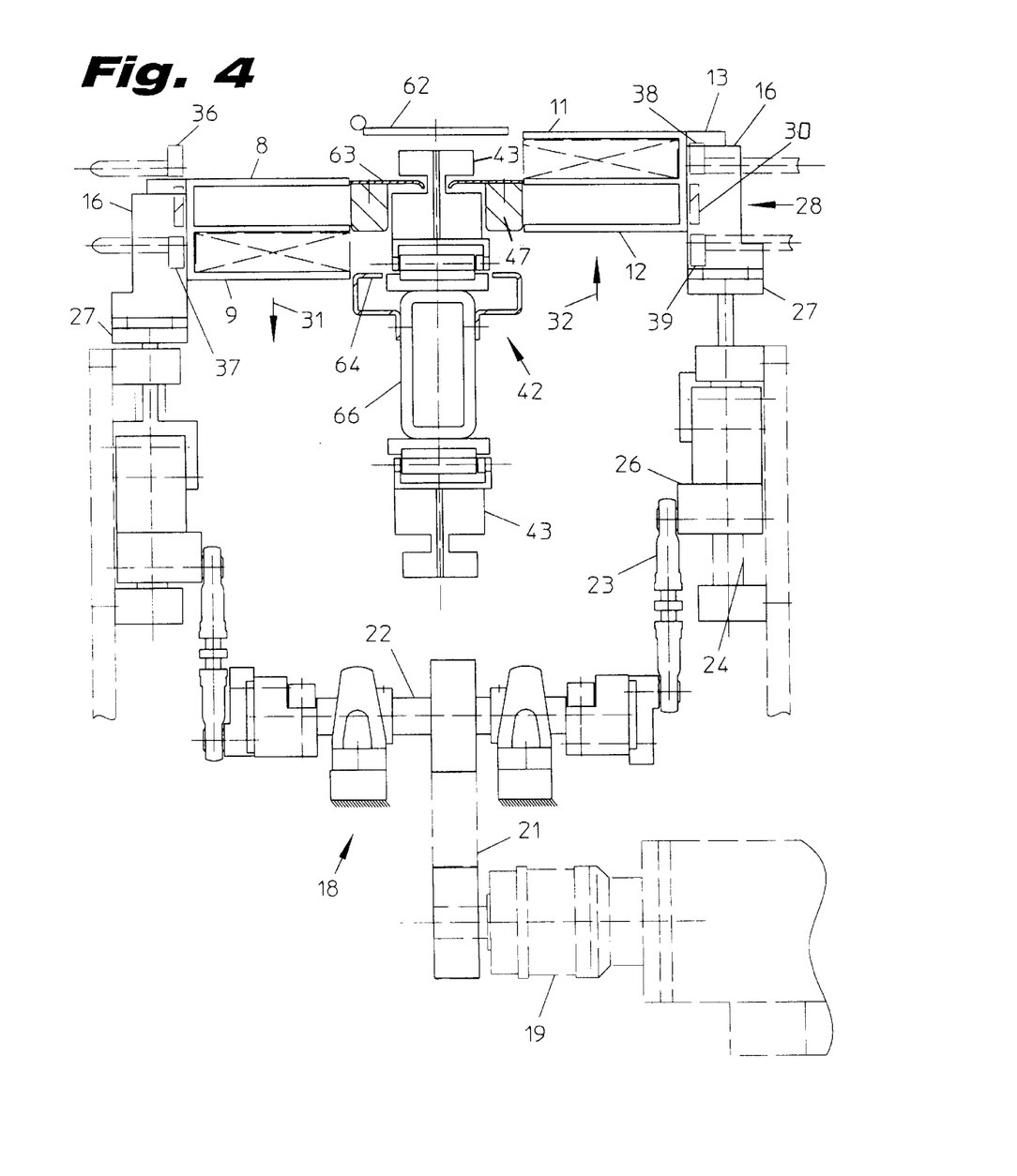
FIG. 4 is a smaller-scale sectional view as seen from the line A–B in FIG. 2.
Figure 5:
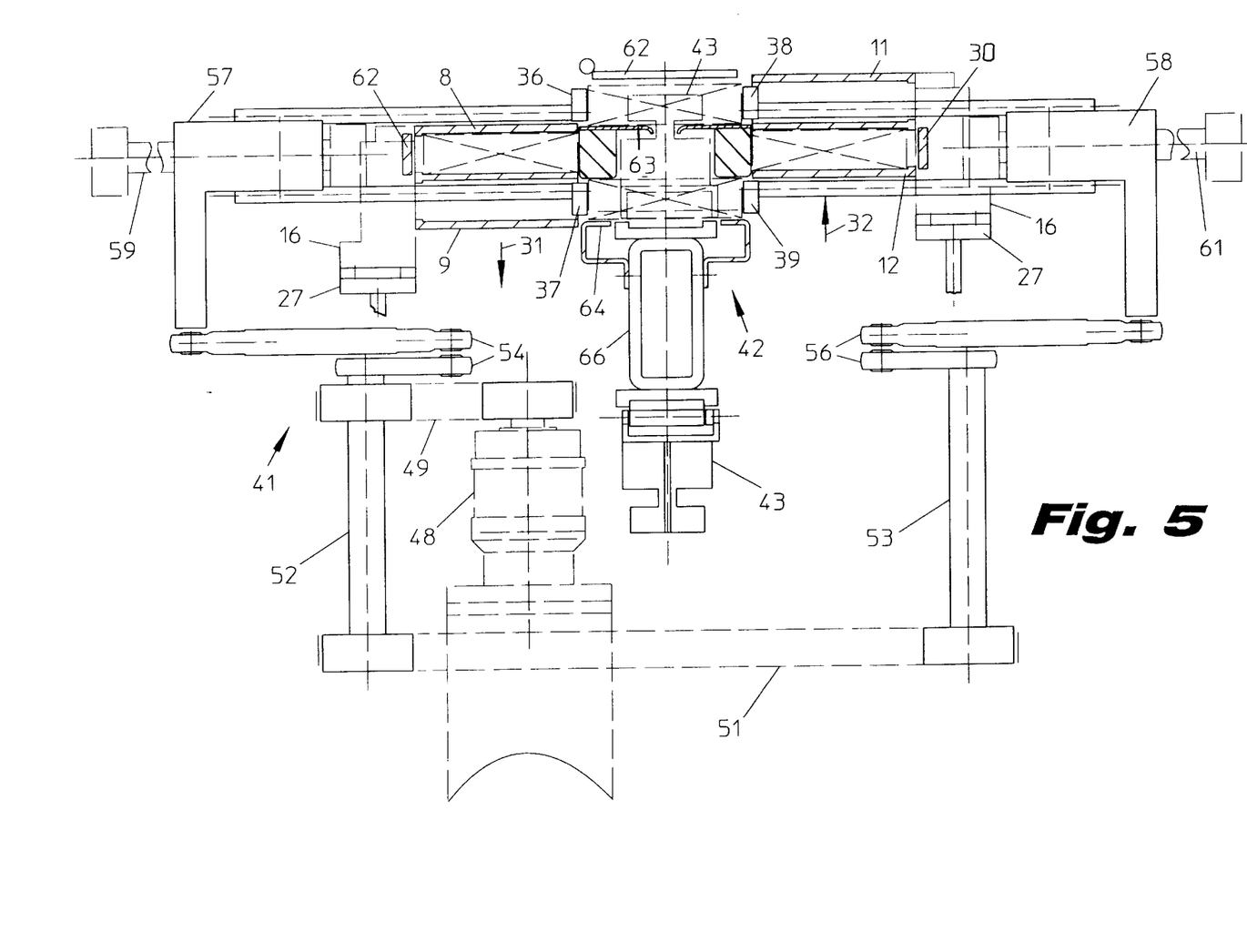
FIG. 5 is a view similar to those of FIGS. 3 and 4 but showing the receptacles for the groups of packets at different levels.

The unit which serves as a means for assembling predetermined numbers of packets 2 (such as ten) into a succession of arrays each of which contains two groups of packets (each such group can contain five packets) is located in or operates to move packets into and from the predetermined plane 28 (which is or which can be a truly horizontal plane) comprises two cassettes 13 each of which comprises two receptacles 8, 9 and 11, 12, and each such receptacle can receive an elongated group of five packets 2. The receptacle 8 or 9 can receive files or groups of five successive packets from the conveyor 3, and the receptacle 11 or 12 can receive files or groups of five successive packets from the conveyor 4. As can be seen in FIG. 3, 4 or 5, the receptacle 8 is disposed at a level above the receptacle 9, and the receptacle 11 is disposed at a level above the receptacle 12.

Each cassette 13 is removably installed in a guide or track 14 provided in one of two housings 16 forming part of a unit 18 serving as a means for displacing the groups of packets 2 in the receptacle 8 or 9 from the plane 28 into an upper or first additional plane 34 and for displacing the groups in the receptacles 11 or 12 from the plane 28 into a lower or second additional plane 33. The means for releasably coupling the cassettes 13 to the respective housings 16 of the displacing unit 18 comprises pivotable locking pawls 17 or any other suitable means for separably securing the cassettes to the unit 18 so that the receptacles 8, 9 move jointly in the direction of arrow 31 (FIG. 3) when the receptacles 11, 12 move as a unit in the direction of the arrow 32 (FIG. 3) or vice versa.

The displacing unit 18 further comprises a prime mover 19 (e.g., an electric motor), a belt transmission 21 which receives torque from the rotary output element of the prime mover 19, a drive shaft 22 which receives torque from the transmission 21, eccentric cranks 23 which are driven by the shaft 22, and carriages 26 which are reciprocable along fixed guide means 24 (e.g., in the form of rods) and are movable up and down toward and away from the plane 28. Each carriage 26 mounts a supporting plate 27 which is or which can be fixedly connected to the respective housing 16.

The aforementioned array assembling unit further comprises one or more lifters 67 serving as a means for transferring successive foremost packets 2 on the conveyors 3 and 4 from the common plane of such conveyors into the plane 28 and into the range of horizontally reciprocable pushers 29 also forming part of the array assembling means. The pushers 29 are movable in the plane 28 to advance successive packets 2 lifted off the conveyors 3, 4 toward and into the adjacent receptacles 8, 12 or 9, 11, and such pushers 29 are movable up and down with the respective cassettes 13 as indicated by the arrows 31 and 32, i.e., at right angles to the plane 28 and the common plane of the upper reaches of the conveyors 3, 4.

The pushers 29 serve to propel packets 2 into the adjacent receptacles 8, 12 or 9, 11 and cooperate with flaps 30 or analogous valving elements which serve as a means for regulating the expulsion of air from the receptacles which are in the process of receiving successive packets 2 of a group of five packets. The flaps 30 are mounted in such a way that they establish clearances or gaps of predetermined width such as is necessary to control the rate of air expulsion and to thus regulate the speed at which the packets 2 are being propelled into the adjacent receptacles in the plane 28. Each flap 30 extends along one of the longer sides of the respective receptacle 8, 9, 11 or 12. The flaps 30 can be stationary in the plane 28; this renders it possible to employ only two flaps 30, one for the receptacles 8, 9 and the other for the receptacles 11, 12 whichever of these receptacles happens to be held in the plane 28.

The apparatus 1 further comprises a unit 41 which serves as a means for shifting packets 2 in the planes 34 and 33 onto a further conveyor 42 located between the conveyors 3 and 4. The unit 41 includes four reciprocable pushers 36, 37, 38 and 39, one for each of the four receptacles 8, 9, 11 and 12. These pushers can penetrate through the adjacent open sides of the respective receptacles to expel complete groups or files of five packets 2 each from such receptacles into the range of longitudinally spaced apart entraining elements 43 on an endless belt or chain 44 of the conveyor 42. The latter further comprises a ramp 47 which slopes downwardly in the direction (arrow 46) of advancement of pairs of groups forming part of successive arrays of ten packets 2 each from the apparatus 1, e.g., into the aforementioned pack boxer of a production line serving to turn out crates or like containers for predetermined numbers of cartons each of which normally contains a formation of ten packets 2 forming two superiposed contacting layers of five packets each.

The shifting unit 41 further comprises a prime mover 48 (e.g., an electric motor), belt transmissions 49, 51, drive shafts 52, 53, eccentrically mounted cranks 54, 56 and slides 57, 58 which are respectively movable along guides 59, 61 and each of which mounts two of the pushers 36 to 39.

As can be best seen in FIGS. 3 to 5, the prime mover 48 drives the transmission 49 which, in turn, drives the shaft 52 for the crank 54. The shaft 52 further transmits torque to the transmission 51 which drives the shaft 53 for the crank 56. The crank 54 transmits motion to the slide 57 which is confined to reciprocatory movements by the guide 59, and the crank 56 transmits motion to the slide 58 which is confined to reciprocatory movements by the guide 61. The slide 57 carries the pushers 36, 37, and the slide 58 carries the pushers 38, 39.

The reference character 62 denotes a pivotable cover or lid at a level above the conveyor 42. The latter further comprises a stationary bottom wall 63 serving to receive groups of packets 2 which are shifted in the plane 34 into the range of entraining elements 43 and a stationary bottom wall 64 which receives successive groups being shifted in the plane 33, again into the range of the entraining elements 43. The conveyor 42 still further comprises a stationary support or guide 66 for the endless flexible element 44 which carries the entraining elements 43.

It is clear that the apparatus 1 further comprises suitable means for synchronizing the movements of various moving parts such as the moving means 29, the pushers 36 to 39, the endless flexible element 44 of the conveyor 42, the conveyors 3, 4 and others.

The operation is as follows:

The foremost packets 2 on the conveyors 3, 4 are lifted seriatim by a single transferring means 67 or by the respective one of two transferring means from the common plane of the conveyors 3, 4 into the plane 28. The thus transferred packets 2 are engaged by the moving means 29 and are propelled into the receptacles 9 and 11 which are then located in the plane 28 (see FIG. 3) As already mentioned above, the flaps 30 are positioned to control or regulate the rate of expulsion of air from the receptacles 9 and 11 during propulsion of packets 2 into such receptacles so that the flaps 30 actually perform the function of brakes or speed reducing means by preventing the packets from impacting against the closed sides of the respective receptacles. This ensures gentle treatment of packets 2 which are being assembled into two groups of five packets each, each such group filling (when fully assembled) the respective receptacle 9 or 11. The moving means 29 are retracted when the transferring means 67 performs or perform an upward stroke to lift packets 2 from the plane of the conveyors 3, 4, and the moving means move the packets 2 in the plane 28 toward and into the respective receptacles (i.e., into the respective cassettes 13) when the transferring means 67 is or are lowered below the plane 28. As mentioned above, the movements of the conveyors 3, 4 are synchronized with those of the transferring means 67 so that at least one packet 2 is located at a level above the transferring means before the latter begins or begin an upward stroke to lift one or two packets from the plane of the conveyors 3, 4 into the plane 28.

When the filling of the receptacles 9, 11 (which are then located in the plane 28) is completed, i.e., when each of these receptacles contains a group of five successive packets, the displacing means 18 causes the two housings 16 (and hence the two cassettes 13) to move in opposite directions (note the arrows 31 and 32 in FIG. 4) so that the freshly filled receptacle 9 is lowered into the plane 34 and the freshly filled receptacle 11 is lifted into the plane 33. This causes the receptacles 8 and 12 to enter the plane 28.

The next step involves the shifting of the two groups of packets 2 from the receptacles 9 and 11 onto the conveyor 42. Thus, the pusher 37 transfers the contents of the receptacle 9 onto the bottom wall 64 and the pusher 38 transfers the contents of the receptacle 11 onto the bottom wall 63. This involves forward movements of the pushers 37, 38 from the positions which are shown in FIG. 4 to those shown in FIG. 5. Such movements of the pushers 37, 38 are respectively shared by the pushers 36 and 39 but the forward strokes of the pushers 36, 39 are idle strokes because there are no groups of packets 2 in front of such pushers.

FIG. 5 further shows that the receptacles 8 and 12 (which are then located in the plane 28) are being filled with groups of packets 2 in stepwise fashion during shifting of groups of packets from the receptacles 9 and 11 in the respective additional planes 33 and 34. This enhances the output of the apparatus 1 because the filling of the receptacles 8 and 12 can at least begin during shifting of packets 2 from the receptacles 9 and 11 onto the conveyor 42.

When the shifting of two groups of packets 2 from the receptacles 9 and 11 onto the respective bottom walls 63 and 64 is completed, the endless flexible element 44 of the conveyor 42 is set in motion so that one of the entraining elements 43 on the element 44 advances the two groups of packets in the direction of the arrow 46. As can be seen FIG. 5, the levels of the bottom walls 63 and 64 (i.e., of the additional planes 33 and 34) are selected in such a way that the upper group of packets forming part of a freshly formed array overlaps but is spaced apart from the lower group of packets forming part of the same array. However, the mutual spacing of the two overlapping groups of packets is reduced to zero (see FIG. 2) as the respective element 43 advances in the direction of arrow 46 because the upper group is caused to slide along the downwardly sloping upper side of the ramp 47 of the conveyor 42 so that the thus converted array of ten packets 2 assumes a configuration which is best suited for introduction into a carton or for the draping of a blank around such converted array so that the converted blank constitutes a carton confining ten packets 2. The pushers 36 to 39 serve as lateral guides for the two groups of packets 2 which are being advanced by the conveyor 42 toward the pack boxer of the production line including the apparatus 1.

The next cycle of operation of the apparatus 1 involves an upward movement of the cassette 13 including the receptacles 8, 9 and a downward movement of the cassette 13 including the receptacles 11 and 12. This moves the freshly filled receptacles 8 and 12 into the additional planes 34 and 33 so that the formation of the next array of ten packets 2 on the conveyor 42 can proceed in the aforedescribed manner.

An important advantage of the improved apparatus 1 is that its output is or can be very high. This is attributable, at least in part, to the feature that the assembly of a fresh array of ten packets in the plane 28 can begin and proceed while the groups of packets of the immediately preceding array are being shifted in the planes 33, 34, i.e, onto the conveyor 42.

Another important advantage of the improved apparatus is that it is designed to ensure gentle treatment of the packets 2 and of the groups and arrays of such packets. This is attributable to a considerable extent to the provision of flaps 30 which control the speed at which the packets 2 are being propelled in the plane 28, i.e., into the adjacent receptacles 8, 12 or 9, 11.

A further important (but optional) feature of the apparatus 1 is that the level of the assembling plane 28 can be selected practically at will. This is due to the provision of the transferring means 67, i.e., the plane of the conveyors 3, 4 can be placed close to or at a level well below the level of the plane 28. Such undertaking renders it possible to select the operational speed of the apparatus 1 independently of the speed of operation of the machine which receives successive formations 7 and even independently of the output of the machine or machines which supply packets 2 to the conveyors 3 and 4.

It will be appreciated that the improved apparatus and the novel method are susceptible of numerous modifications without departing from the spirit of the invention. For example, the conveyor 42 can be replaced by two discrete conveyors one of which serves to advance the upper group of packets 2 in and from the plane 34 and the other of which serves to advance (in the plane 33 and in the direction indicated by the arrow 46) the lower group of packets forming part of one and the same array.

The cassettes 13 can form part of the respective housings 16, i.e., of the displacing means 18. However, the provision of separable cassettes 13 is preferred at this time because these cassettes can be detached from the respective housings 16 in the event of damage, i.e., to be replaced with intact cassettes, and/or for the purpose of gaining convenient access to certain parts of the apparatus 1. For example, a cassette 13 will be detached from the corresponding housing 16 if one or more packets happen to become jammed in one of the respective receptacles 8, 9 or 11, 12, i.e., the emptying of a receptacle is more convenient and less time consuming if such operation is carried out while the respective cassette is detached from the displacing means 18.

One of the most important advantages of the improved method and apparatus is that they ensure a practically 100-percent utilization of each working cycle, i.e., the output of two discrete film wrappers or the output of a twin-track film wrapper can be converted into a series of successive formations (processed arrays) 7 at a very high frequency.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art of manipulating packets of the tobacco processing industry and, therefore, such adaptations should and are intended to be comprehended within the meaning and range of equivalence of the appended claims.

What is claimed is:

1. A method of manipulating packets of the tobacco processing industry, comprising the steps of advancing first and second rows of successive packets along first and second paths; assembling in a predetermined plane successive arrays of first and second groups, containing predetermined numbers of packets, from the packets respectively advanced along said first and second paths; displacing the first and second groups of successive arrays from the predetermined plane into first and second additional planes which are disposed at different levels; shifting at least one of the thus displaced first and second groups of successive arrays in the respective additional plane so that the thus shifted at least one group and the other group of the respective array overlap and are spaced apart from each other; and reducing the spacing between the overlapping first and second groups of successive arrays so that such groups form two contacting superimposed layers of packets.

2. The method of claim 1, wherein said first and second paths are adjacent and parallel to each other and each of said groups contains an elongated file of successive packets, said first and second planes being respectively located above and below said predetermined plane, said shifting step including moving the first and second elongated groups in the respective additional planes sideways into a third path between said first and second paths.

3. The method of claim 2, wherein said predetermined plane is located at a first level and said first and second paths are located at a different second level, said assembling step comprising transferring successive packets of said first and second groups from the respective first and second paths into said predetermined plane.

4. The method of claim 3, wherein said assembling step further comprises moving seriatim discrete packets of the first and second groups in said predetermined plane.

5. The method of claim 4, wherein said assembling step further comprises moving the groups of successive arrays in said predetermined plane longitudinally of the respective files.

6. The method of claim 3, wherein said transferring step includes lifting packets from the plane of said first and second paths into said predetermined plane.

7. The method of claim 2, wherein said advancing step includes transporting said first and second rows along the respective first and second paths in a predetermined direction, said step of reducing said spacing including conveying the overlapping first and second groups of successive arrays in said predetermined direction along said third path longitudinally of the groups.

8. The method of claim 7, wherein said step of reducing said spacing further includes transporting the first groups of successive arrays downwardly toward and onto the second groups of the respective arrays.

9. The method of claim 2, further comprising the step of assembling a next-following array in said predetermined plane in the course of said shifting step.

10. The method of claim 2, wherein said assembling step includes propelling packets into receptacles with attendant expulsion of air from the receptacles, and further comprising the step of regulating the expulsion of air from the receptacles to thus control the speed of propulsion of packets being propelled into the receptacles.

11. Apparatus for manipulating packets of the tobacco processing industry, comprising first and second means for respectively advancing first and second rows of successive packets along first and second paths; means for assembling in a predetermined plane successive arrays of first and second groups, containing predetermined numbers of packets, from the packets respectively advanced along said first and second paths; means for displacing the first and second groups of successive arrays from said predetermined plane into first and second additional planes which are disposed at different levels; and means for shifting at least one of the thus displaced first and second groups of successive arrays in the respective additional plane so that the thus shifted at least one group and the other group of the respective array overlap each other.

12. The apparatus of claim 11, wherein said assembling means comprises at least one receptacle for each of the first and second groups of the respective arrays and said displacing means comprises means for displacing said receptacles.

13. The apparatus of claim 12, wherein said displacing means comprises means for moving the at least one receptacle for the first groups upwardly from said predetermined plane into said first additional plane and for moving the at least one receptacle for the second groups from said predetermined plane downwardly into said second additional plane, said shifting means comprising means for shifting the first and second groups of successive arrays in the respective additional planes into a third path wherein the first and second groups of successive arrays overlap and are spaced apart from each other.

14. The apparatus of claim 13, further comprising means for conveying successive arrays of first and second groups along said third path.

15. The apparatus of claim 14, wherein said assembling means comprises a first pair of receptacles for the first groups and a second pair of receptacles for the second groups of said arrays, one receptacle of each pair being located in said predetermined plane when the other receptacle of the respective pair is located in the respective additional plane and vice versa.

16. The apparatus of claim 15, wherein said receptacles are located at three different levels whenever a receptacle of each pair is located in said predetermined plane.

17. The apparatus of claim 14, wherein said conveying means comprises means for effecting a movement of at least one group of each of said successive arrays toward the other group of the respective array during conveying of said arrays along said third path so that the spacing between the groups of successive arrays is reduced at least close to zero.

18. The apparatus of claim 17, wherein said means for effecting a movement includes a downwardly sloping ramp for the first groups of successive arrays.

19. The apparatus of claim 12, wherein said receptacles comprise cassettes for groups of packets and further comprising means for separably coupling said cassettes to said displacing means.

20. The apparatus of claim 12, wherein said assembling means further comprises means for propelling packets into the receptacles at said predetermined plane with attendant expulsion of air from the receptacles, :and further comprising means for regulating the expulsion of air from said receptacles to thus control the speed of propulsion of packets being propelled into the respective receptacles.

21. The apparatus of claim 12, wherein each of said groups comprises a file of discrete packets and said assembling means further comprises means for moving discrete packets of the groups in said predetermined plane.

22. The apparatus of claim 11, wherein said predetermined plane is located at a first level and said first and second paths are located at at least one additional level other than said first level, said means for assembling including means for transferring packets from said at least one additional level into said predetermined plane.

23. The apparatus of claim 22, wherein said first and second paths are located in a common additional plane at a level below said predetermined plane.

24. The apparatus of claim 11, wherein said first and second paths are adjacent and at least substantially parallel to each other.

* * * * *